United States Patent
Byrd

(10) Patent No.: US 6,240,683 B1
(45) Date of Patent: Jun. 5, 2001

(54) ANCHORING SYSTEM FOR MANUFACTURED HOUSING

(76) Inventor: William D. Byrd, Rte. 1, Box 127A, San Mateo, FL (US) 32187

( * ) Notice: Subject to any disclaimer, the term of this patent is extended or adjusted under 35 U.S.C. 154(b) by 0 days.

(21) Appl. No.: 09/466,678

(22) Filed: Dec. 20, 1999

(51) Int. Cl.[7] .................................................. E02D 27/00
(52) U.S. Cl. .......................... 52/169.9; 52/295; 52/299; 52/DIG. 11
(58) Field of Search .................... 52/295, 299, DIG. 11, 52/169.9

(56) References Cited

U.S. PATENT DOCUMENTS

| | | |
|---|---|---|
| 2,706,313 * | 4/1955 | Radman .................................. 52/295 |
| 3,601,944 | 8/1971 | Shepherd . |
| 4,348,843 | 9/1982 | Cairns et al. . |
| 4,417,426 | 11/1983 | Meng . |
| 4,562,673 | 1/1986 | Barari . |
| 4,864,785 | 9/1989 | Schneider . |
| 5,359,821 | 11/1994 | Merriman . |
| 5,697,191 | 12/1997 | MacKarvich . |
| 5,784,844 * | 7/1998 | Mackarvich ........................... 52/292 |

* cited by examiner

Primary Examiner—Christopher T. Kent
Assistant Examiner—Dennis L. Dorsey
(74) Attorney, Agent, or Firm—Thomas C. Saitta

(57) ABSTRACT

An anchoring system for a manufactured home and a method of anchoring a manufactured home utilizing longitudinal central and exterior slabs, strap anchors embedded in the slabs, and straps connecting the home to the slabs, where the straps extend from the central slab to an exterior I-beam underneath the home and from the exterior slab to an interior I-beam on each end of home, and where frame straps extend from the home to anchors in the exterior slabs and longitudinally spaced interior straps extend from the exterior slabs to the interior I-beams.

12 Claims, 4 Drawing Sheets

ANCHORING SYSTEM FOR MANUFACTURED HOUSING

BACKGROUND OF THE INVENTION

This invention relates generally to the field of systems, methods, or devices used to secure, stabilize or anchor manufactured homes to the ground after the homes have been transported to the building site and mounted onto support piers. More particularly, the invention relates to such systems, methods or devices which utilize metal tie down straps connected to ground anchors.

Manufactured homes are produced at factories and then transported to sales centers and final building sites for assembly and use. The overall size of the transportable units are limited by transportation considerations, in that they cannot exceed certain maximum dimensions for travel over roadways. It is thus very common to provide for manufactured homes which are built in separate components or units which can be individually transported to the sites and then assembled. Such homes are often referred to as double wide home, since it is very common to provide two longitudinally extensive units which are joined lengthwise to form the larger finished home. The units are constructed on two parallel chassis I-beams, the I-beams providing longitudinal support and allowing for the attachment of wheels to the units for transport. The I-beams remain exposed beneath the floor of the home. At the assembly or use site, the I-beams are usually supported by a large number of spaced support piers or columns, constructed of concrete blocks with wedge-shaped wooden inserts to provide for the proper support height beneath the I-beam at each location.

Because the manufactured homes are to be transported, excessive weight cannot be tolerated, and so manufacturing considerations stress strong but light materials for construction. This fact, along with the fact that they are positioned several feet above ground level, means that the homes are very susceptible to adverse effects of high winds, especially if the area below the structure is not covered. Therefore, federal and local codes and standards related to manufactured homes require that the homes be provided with an anchoring system to stabilize the home against wind load effects. The most commonly utilized system involves a large number of metal straps which are secured to the frames, trusses or I-beams of the manufactured homes and then to ground anchors embedded into the ground around and beneath the home. A major problem with these systems is that the fixation and retention of the ground anchors, which usually comprise a shaft with helical plates which is rotated into the ground, is highly dependent on the type and density of the soil as well as the particular angle of insertion relative to the tensile load. Under high wind loads, movement of the anchors or actual bending of the upper portion of the anchor is not uncommon, resulting in loss of stabilization of the manufactured home. The home may shift horizontally or vertically relative to the support piers, which can cause damage or complete destruction of the home.

An example of an improved stabilization system for manufactured housing is shown in U.S. Pat. No. 5,697,191 to MacKarvich. Straps are connected in a crossing manner from the I-beams to ground anchors, and stabilizing plates extend between adjacent support piers and from the support piers to the ground anchors, thus maintaining the ground anchors in a spaced relation to prevent movement of the anchors in a direction which would loosen the straps. This system continues to utilize helical anchors placed into the ground, and does not provide any means to directly counter movement in the longitudinal direction.

It is an object of this invention to provide a system and method for securing, stabilizing and anchoring a manufactured home which effectively precludes movement in all directions, horizontal and vertical, when placed under wind load forces. It is an object to provide such a system and method which utilize standard metal straps and embedded anchors which receive the straps, such that the system can be assembled easily and quickly without recourse to special equipment. It is an object to provide the system and method where the straps are connected directly to the I-beams supporting the manufactured housing units. It is an object to provide such a system and method where lateral and longitudinal movement is less than one half inch at 150% of the design load.

SUMMARY OF THE INVENTION

The invention comprises in general an anchoring or stabilization system and method for securing and immobilizing manufactured homes which are prefabricated on parallel chassis I-beams and transported to a remote site for installation, where two units are joined lengthwise to create a larger home often referred to as a double wide home. Support piers are positioned at spaced intervals under the I-beams to support the entire home a short distance above the ground, and tie down metal straps connect the I-beams or the frame of the home to ground anchors to prevent excessive movement during high winds.

The system of the invention comprises longitudinally extending foundation slabs of poured concrete which extend beneath the I-beams of the home, preferably a relatively wide central slab which resides beneath both interior I-beams and a pair of less wide exterior slabs, one positioned beneath each exterior I-beam. The support piers are positioned atop the foundation slabs, and typically comprise concrete blocks and wedges for leveling adjustments. Anchors which receive the straps are embedded in the foundation slabs at particular locations, with certain straps running longitudinally while the majority of the straps extend laterally. At each end of the home, lateral end straps are crossed to form an "X" between the exterior slab and the central slab for each of the two home component units, with one lateral strap extending from an anchor embedded in the central slab to the exterior I-beam of the unit and the other lateral strap extending from an anchor embedded in the exterior slab to the interior I-beam of the same unit. The lateral straps are preferably connected to the I-beams by a clip or hook attached to the end of the strap, with the strap wrapped around the I-beam to secure the clip in place. For each unit, a longitudinal strap extends from an anchor embedded in the central slab to the interior I-beam at each end, with the strap preferably connected to the vertical component of the I-beam by a mechanical fastener. Frame straps extend downward at spaced longitudinal intervals along the sides of the units from the outside frames or trusses of each unit and are connected to the ground anchors securing the interior lateral straps which extend upward to the interior I-beams. For longer units, a second pair of anchors may be centrally positioned on the central slabs, with the lateral straps extending upward from the central slab to the exterior I-beams.

This combination of longitudinal foundation slabs, embedded anchors, crossed lateral end straps, interval-spaced interior lateral straps and frame straps provides an anchoring system which rigidly connects the manufactured home to the ground, such that very little movement occurs under relatively severe wind load.

DETAILED DESCRIPTION OF THE INVENTION

Figure 1:
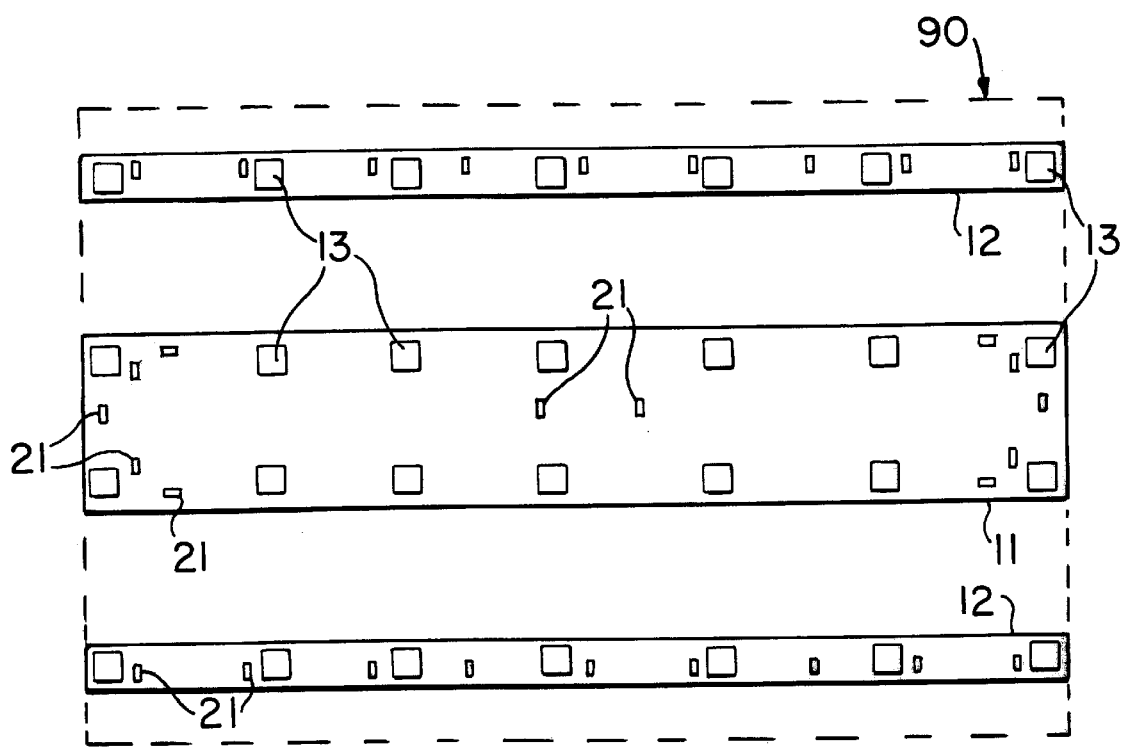
FIG. 1 is a plan view of the foundation slabs showing the location of the piers and embedded anchors for a double wide manufactured home having an outer perimeter illustrated by the dashed lines.

With reference to the drawings, the invention will now be described in detail with regard for the best mode and the preferred embodiment. The invention is a system and method for stabilizing, securing and anchoring a manufactured home, and in particular a manufactured home comprised of two prefabricated component units joined lengthwise to form a unitary home, to severely limit movement of the home when exposed to high wind loads. In general, the system comprises a longitudinally extending central foundation slab 11, a pair of longitudinally exterior foundation slabs 12, anchors 21 embedded into the slabs 11 and 12, sets of lateral crossing end straps 31 and 32 connected to the anchors 21 and to the I-beams 91 of the manufactured home 90, longitudinal straps 33 connected to anchors 21 embedded in the central slab 11 and to the I-beams 91, interior lateral straps 34 connected to anchors 21 embedded in the exterior slabs 12 and to the I-beams, and exterior frame straps 35 connected to anchors 21 embedded in the exterior slabs and to the frames or trusses of the manufactured home 90.

The system may be utilized with homes 90 of differing dimensions, and the preferred dimensions and locations of various components are often determined by the particular location of predetermined features on the manufactured home 90. In particular, the length, width and separation of the foundations slabs 11 and 12, and the location of most of the anchors 21 are a function of the dimensions of the home 90, the location of the I-beams 91 and the location of the frame straps 35, for example. Therefore, the dimensions set forth herein are for illustration purposes only and are not to be taken as limiting regarding the scope of the invention.

Referring to FIG. 1, the relative positions of the foundation slabs or footers 11 and 12 are indicated, along with the positioning of the anchors 21 and support piers 13. The elongated rectangular foundation slabs 11 and 12 are formed of poured concrete preferably containing reinforcing fibers, mesh or the like, each approximately about 12 inches in depth. The lengths of the slabs 11 and 12 are approximately equal to the length of manufactured home 90. The central foundation slab 11 is of sufficient width so as to reside beneath both interior I-beams 91 on the home 90. Preferably, central slab 11 is composed as a unitary member, but it could be composed of two individual narrow slabs. The exterior foundation slabs 12 are parallel to the central slab 11 and are positioned directly beneath the exterior I-beams 91, with a width sufficient to fully underlie the support piers 13. The foundation slabs 11 and 12 are produced with a relatively planar surface, and the support piers 13 are constructed directly atop the slabs 11 and 12. The support piers 13 may be of any suitable known construction, such as multiple concrete blocks or metal jacks, and typically are topped with wedge-shaped wooden inserts for precise height control are each pier 13. The support piers 13 are spaced at intervals longitudinally, and preferably are aligned laterally as well, as shown in the drawing.

Prior to hardening of the poured concrete in the slabs 11 and 12, strap anchors 21 are embedded at various locations. Anchors 21 may be of any known type used in conjunction with metal tie down straps 30 and which are suitable for concrete embedment, and typically comprise a depending curved or jointed rod or rods connected to a generally U-shaped bracket retaining one or two slotted bolts to receive the straps 30. The bracket remains above the surface of the concrete with the rods embedded therein to secure the anchor 21. On the exterior slabs 12, the anchors 21 are embedded at generally evenly spaced, longitudinal intervals, preferably toward the outer edge of the slabs 12, and are oriented to receive straps 30 extending in the lateral direction. The anchors 21 are typically spaced at about five foot intervals, and an anchor 21 should be positioned within five feet of each end of the exterior slabs 12. On the central slab 11, a pair of anchors 21 for receiving laterally oriented straps 30 are positioned within about five feet of each end, with the anchors 21 preferably located toward the outer edge of the central slab 11. One or two anchors 21 are positioned on each end of the central slab 11, each preferably aligned beneath one side of the interior I-beams 91, and these anchors 21 are oriented to receive straps 30 extending in the longitudinal direction. For longer homes 90, an additional pair of laterally oriented anchors 21 may be located in the middle region of the central slab 11. In many homes 90, marriage wall straps 36 are provided near each end, and a corresponding anchor 21 is embedded along the midline of the central slab 11 for attachment of these straps 36.

Figure 2:
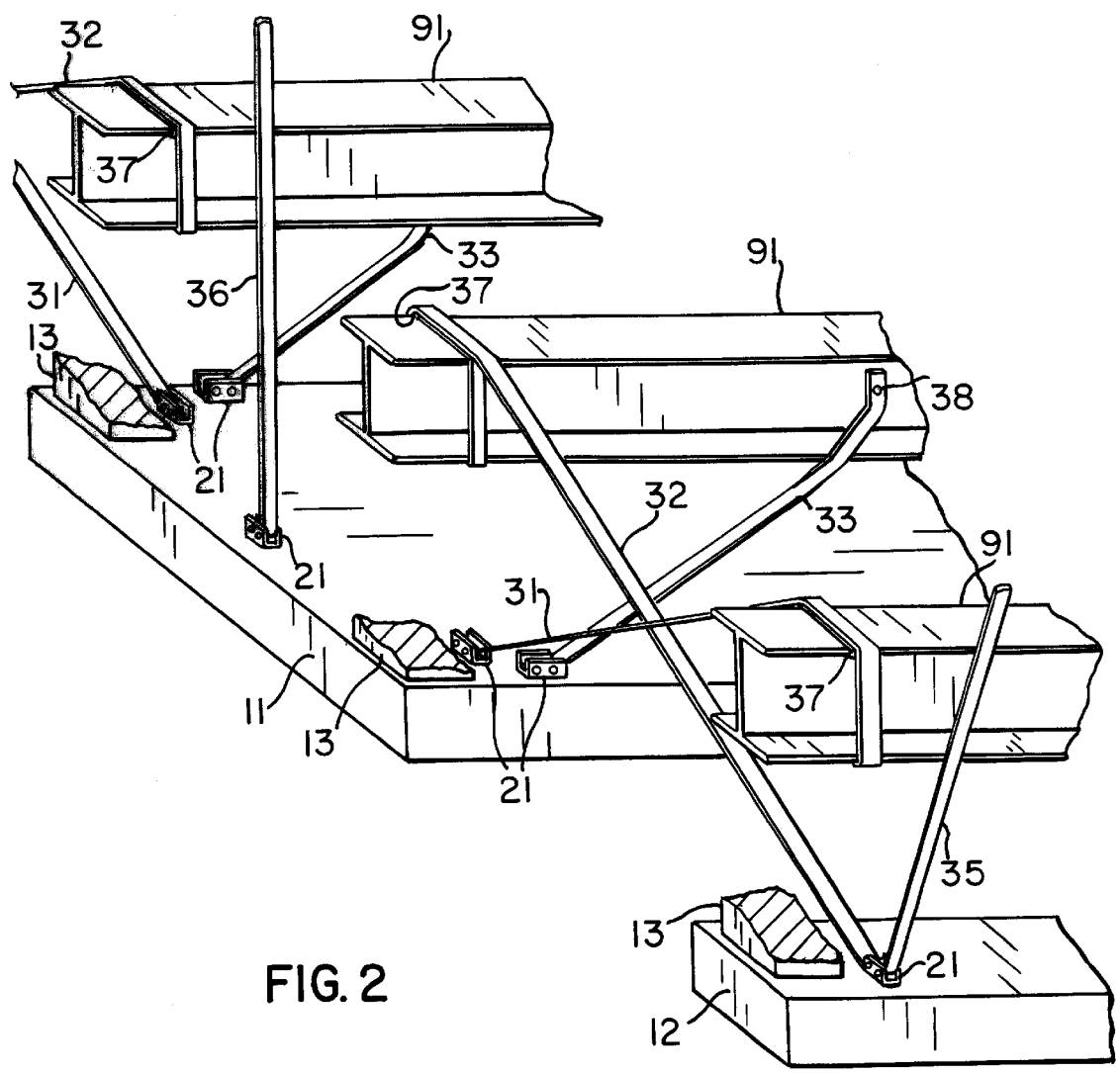
FIG. 2 is a partial perspective view of the ends of the chassis I-beams, the foundation slabs and the lateral and longitudinal strap members, with the remainder of the home and portions of the piers removed for clarity.
Figure 3:
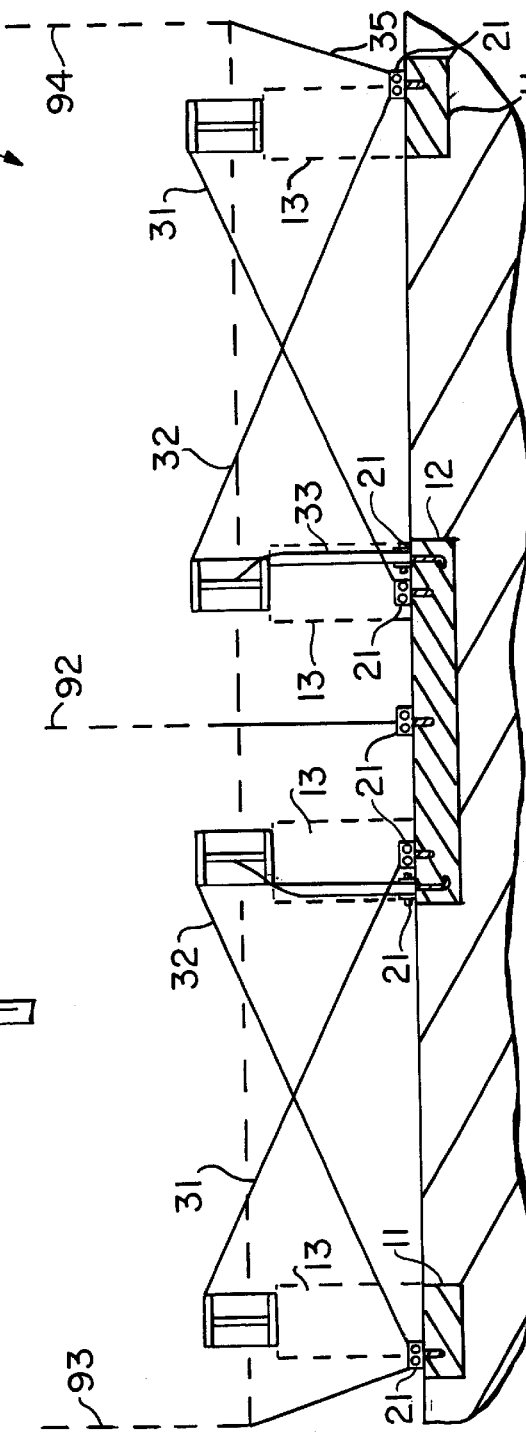
FIG. 3 is an end view taken in the longitudinal direction showing the relative locations of the I-beams, piers, straps, anchors and foundation slabs, with the body of the home and piers shown in outline form.
Figure 4:
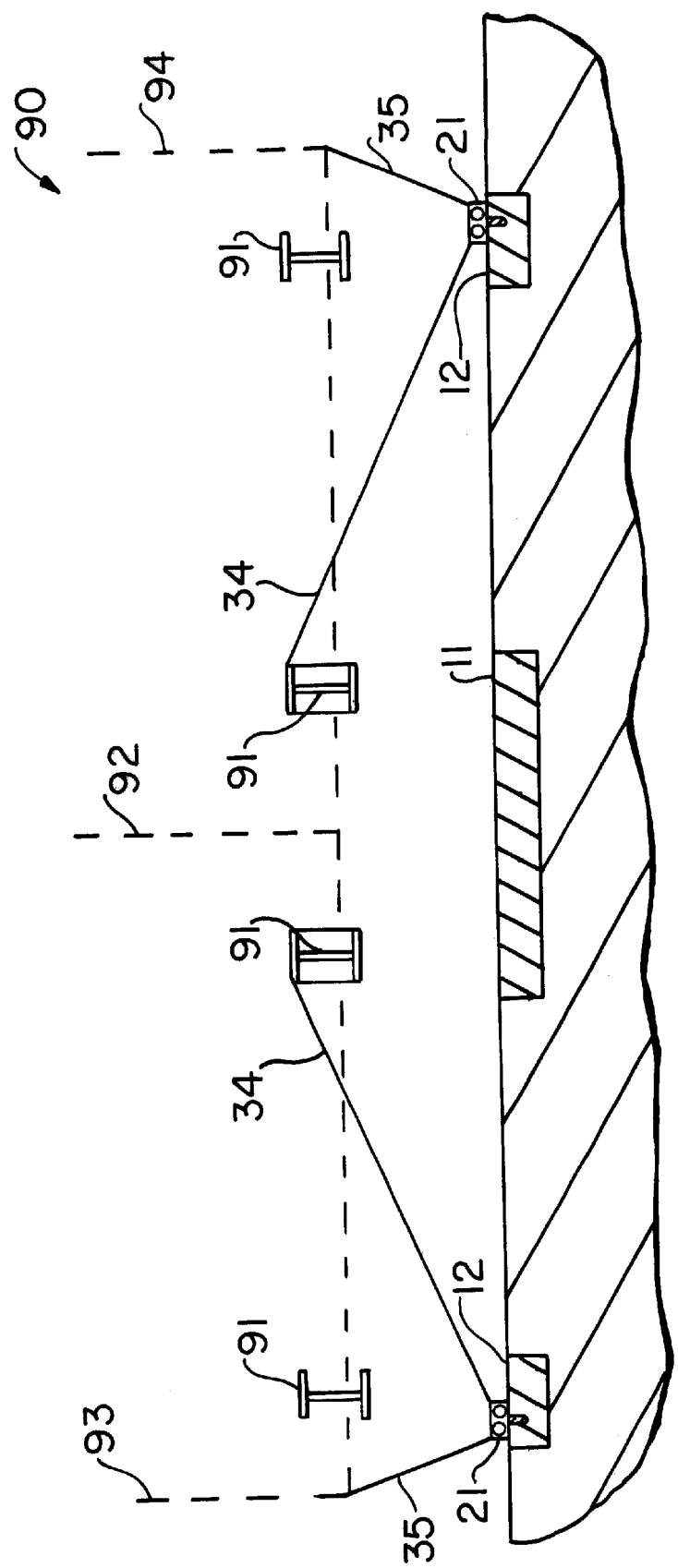
FIG. 4 is a longitudinal view taken at an interior position showing the relative locations of the I-beams, straps, anchors and foundation slabs, with the body of the home shown in outline form.

With reference to FIGS. 2, 3 and 4, the arrangement of the strap members 30 can be seen. Such straps 30 are well known and standard in the industry, and typically comprise thin steel strips about 1.25 inches wide and about 0.037 inches thick, usually galvanized and capable of withstanding loads in excess of 5500 pounds without failure. Lengths may be joined by crimping connectors to form longer straps 30 where necessary. The strap members 30 comprise interior lateral crossing end straps 31, exterior lateral crossing end straps 32, longitudinal straps 33, interior lateral straps 34 and exterior frame straps 35. Frame straps 35 are secured to the structure during the manufacturing process, and extend from the internal frame or trusses of the manufactured home 90 outward beneath and behind the side walls at spaced intervals, typically about five feet apart. The remaining straps 30 are usually connected on site in the assembly process.

Figure 6:
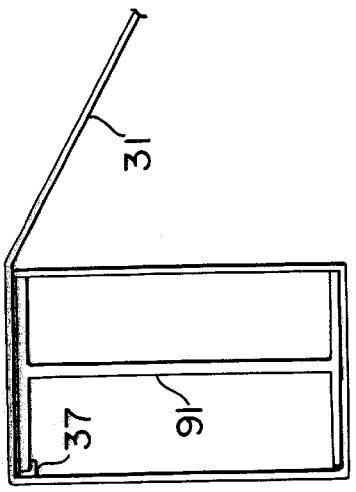
FIG. 6 is an end view of an I-beam showing attachment of a lateral strap.

Focusing now on FIGS. 2 and 3, the home 90 comprises two separate units 93 and 94 joined lengthwise along a marriage wall 92. The arrangement of the anchors 21 and straps 30 are preferably symmetrical with respect to each unit. At each end of each unit 93 and 94, an interior lateral crossing end strap 31 extends from an anchor 21 embedded in the central slab 11 up to the exterior I-beam 91, and an exterior lateral crossing end strap 32 extends from an anchor 21 embedded in one of the exterior slabs 12 upward to the interior I-beam 91, such that the straps 31 and 32 form an X-shape when viewed down the longitudinal direction. The straps 31 and 32 are secured to the anchors 21 and tightened in standard fashion. The straps 31 and 32 are preferably connected to the I-beams 91 as shown in FIG. 6. A clip or hook member 37 is connected to the end of each strap 31 or 32, and the clip 37 is mounted onto the far edge of the top member of the I-beam 91. The strap 31 or 32 is then wrapped around the I-beam 91 to completely encircle it so as to further retain the clip 37 in place when the strap 31 or 31 is tightened and secured to the anchor 21.

The endmost frame straps 35 are connected to anchors 21 mounted in the exterior slabs 12, preferably the same anchors 21 retaining the exterior lateral crossing end straps 32. The anchors 21 are mounted so as to be positioned inward from the exit point of the frame straps 35, so that the straps 35 angle inwardly toward the exterior slabs 12. The home 90 is also anchored at spaced longitudinal intervals as shown in FIG. 4. The interior frame straps 35 are connected to longitudinally spaced anchors 21 positioned in the exterior slabs 12. Interior lateral straps 34 are disposed from longitudinally spaced anchors 21 positioned in the exterior slabs 12 and extend to the interior I-beams 91, with the straps 34 encircling the I-beam 91 and clipped in place as shown in FIG. 6. Preferably, some or all of the anchors 21 mounted in the exterior slabs 12 retain both an interior lateral strap 34 and a frame strap 35.

Figure 5:
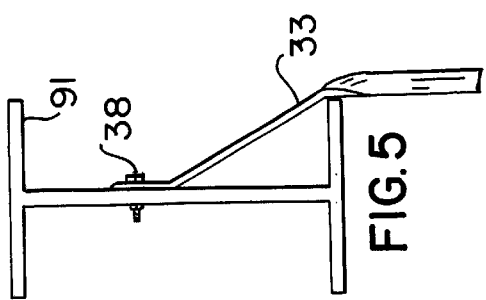
FIG. 5 is an end view of an I-beam showing attachment of a longitudinal strap.

A pair of longitudinal straps 33 connect the interior I-beams 91 to the central slab 11 on each end. The straps 33 are connected in known manner to longitudinally oriented anchors 21 preferably mounted beneath the exterior edges of one or both of the interior I-beams 91 near each end of central slab 11. The longitudinal straps 33 are connected to the vertical member of the I-beam 91 by suitable mechanical fastening means 38, such as a bolt and nut combination extending through an aperture cut into the I-beam 91, as shown in FIG. 5. The longitudinal straps 33 are joined to the I-beams 91 inward from the anchors 21, so that the strap 33 is positioned at an angle to better resist longitudinal movement. Similar longitudinal straps 33 could also be mounted and connected to the exterior I-beams if desired.

The anchoring system described above is much superior to the standard anchoring systems currently in use. Load testing under established protocols were performed on a 28' by 44' double wide manufactured home anchored with the system of the invention. Load ratings based on the Federal Manufactured Homes Construction and Safety Standards were employed, to wit, 47 pounds per square foot horizontal wind load and 32 pounds per square foot uplift wind load. Three lifting beams were placed under the I-beams, perpendicular to the main frame. Air operated jacks were placed on rollers under the lifting beams, two for each beam. Lateral and longitudinal loads were applied, with steel beams used to distribute the transverse and longitudinal loads to the home. For lateral testing, the loads were applied to the outer ends of the 2" by 6" floor joists by means of the steel beams. For longitudinal testing, the loads were applied to the ends of the I-beams. Load cells were utilized to measure the applied loads. Rulers and plumb bobs were used to indicate horizontal movement. Loads were applied in increments equal to 25% of the design load up to an upper limit of 150%.

Because of the shortcomings of the known anchoring systems, regulations typically allow for horizontal travel of up to 9 inches in any one direction under design load. Thus in a wind reversal situation, such as would be encountered with a tornado or hurricane, where the wind would first strike the home from one direction followed by wind striking the home from the opposite direction, a home which is secured under acceptable standards can travel a total of 18 inches, which would at a minimum result in extensive damage to the structure and most likely would result in the home being knocked from its supports. The test results for the system at hand show an incredible improvement in stabilization of the home. For the lateral load test at 27,500 pounds, horizontal movement ranged only from 0.30 to 0.16 inches, with an average of approximately 1/16" at design load and less than 1/4" at 150%. For the longitudinal load test at 19,360 pounds, the horizontal movement ranged only from 0.61 to 0.32 inches, with an average of approximately 3/16" at design load and less than 3/8" at 150%. Thus in a wind reversal situation, the home would only move a maximum of 1/2 inch. Vertical movement in these tests was negligible.

It is contemplated that equivalents and substitutions for elements set forth above may be obvious to those skilled in the art, and therefore the true scope and definition of the invention is to be as set forth in the following claims.

I claim:

1. An anchoring system for a manufactured home comprising two pre-manufactured units joined lengthwise to form said home, each unit having parallel sets of I-beam supports which support a frame, such that when said units are joined together there are two interior I-beams and two exterior I-beams, the anchoring system comprising:

a longitudinally extending concrete central slab and a pair of longitudinally extending exterior slabs positioned on opposite sides of said central slab and separated therefrom, said central slab for positioning beneath the interior I-beams and said exterior slabs for positioning beneath the exterior I-beams;

anchors for receiving and securing straps, said anchors being embedded in said central slab and said exterior slabs;

interior lateral crossing end straps at each end of said central slab, each said interior lateral crossing end strap extending from one said anchor embedded in said central slab and adapted to be connected to one of the exterior I-beams;

exterior lateral crossing end straps at each end of said exterior slabs, each said exterior lateral crossing end strap extending from one said anchor embedded in one of said exterior slabs and adapted to be connected to one of the interior I-beams;

interior lateral straps longitudinally spaced along each of said units, each said interior lateral strap extending from one said anchor embedded in one of said exterior slabs and adapted to be connected to one of the interior I-beams;

longitudinal straps at each end of said central slab, each said longitudinal strap extending inwardly from one of said anchors embedded in said central slab and adapted to be connected to one of the interior I-beams;

longitudinally spaced support piers positioned on said central slab and on said exterior slabs, said support piers for supporting the interior and exterior I-beams; and longitudinally spaced exterior frame straps, each said frame strap extending from one said anchor embedded in one of said exterior slabs and adapted to be connected to the frame.

2. The system of claim 1, where some of said anchors embedded in said exterior slabs are connected to both an exterior lateral crossing strap and a frame strap.

3. The system of claim 1, further comprising clip members connected to said interior lateral crossing end straps, said exterior lateral crossing end straps and said interior lateral straps, where said clip members are adapted to connect said interior lateral crossing end straps, said exterior lateral crossing end straps and said interior lateral straps to the interior and exterior I-beams.

4. The system of claim 3, further comprising mechanical fastening means which are adapted to connect said longitudinal straps to the interior I-beams.

5. A manufactured home assembly comprising two pre-manufactured units joined lengthwise to form said assembly, each unit having parallel sets of I-beam supports which support a frame, such that when said units are joined together there are two interior I-beams and two exterior I-beams;

longitudinally extending concrete central slab and a pair of longitudinally extending exterior slabs positioned on opposite sides of said central slab and separated therefrom, said central slab being positioned beneath said interior I-beams and said exterior slabs being positioned beneath said exterior I-beams;

anchors for receiving and securing straps, said anchors being embedded in said central slab and said exterior slabs;

interior lateral crossing end straps at each end of said central slab, each said interior lateral crossing end strap extending from one said anchor embedded in said central slab to one of said exterior I-beams;

exterior lateral crossing end straps at each end of said exterior slabs, each said exterior lateral crossing end strap extending from one said anchor embedded in one of said exterior slabs to one of said interior I-beams;

interior lateral straps longitudinally spaced along each of said units, each said interior lateral strap extending from one said anchor embedded in one of said exterior slabs to one of said interior I-beams;

longitudinal straps at each end of said central slab, each said longitudinal strap extending inwardly from one of said anchors embedded in said central slab to one of said interior I-beams;

longitudinally spaced support piers positioned on said central slab and on said exterior slabs, said support piers supporting said interior and exterior I-beams; and longitudinally spaced exterior frame straps, each said frame strap extending from one said anchor embedded in one of said exterior slabs to said frame.

6. The assembly of claim 5, where some of said anchors embedded in said exterior slabs are connected to both an exterior lateral crossing strap and a frame strap.

7. The assembly of claim 5, further comprising clip members connected to said interior lateral crossing end straps, said exterior lateral crossing end straps and said interior lateral straps, where said clip members connect said interior lateral crossing end straps, said exterior lateral crossing end straps and said interior lateral straps to said interior and exterior I-beams.

8. The assembly of claim 7, further comprising mechanical fastening means which connect said longitudinal straps to said interior I-beams.

9. A method for anchoring a manufactured home comprising two pre-manufactured units joined lengthwise to form said home, each unit having parallel sets of I-beam supports which support a frame, such that when said units are joined together there are two interior I-beams and two exterior I-beams, the anchoring method comprising:

providing a longitudinally extending concrete central slab and a pair of longitudinally extending exterior slabs positioned on opposite sides of said central slab and separated therefrom, positioning said central slab beneath the interior I-beams and positioning said exterior slabs beneath the exterior I-beams;

providing anchors for receiving and securing straps, embedding said anchors in said central slab and said exterior slabs;

providing interior lateral crossing end straps at each end of said central slab, extending each said interior lateral crossing end strap from one said anchor embedded in said central slab to one of the exterior I-beams;

providing exterior lateral crossing end straps at each end of said exterior slabs, extending each said exterior lateral crossing end strap from one said anchor embedded in one of said exterior slabs to one of the interior I-beams;

providing interior lateral straps longitudinally spaced along each of said units, extending each said interior lateral strap from one said anchor embedded in one of said exterior slabs to one of the interior I-beams;

providing longitudinal straps at each end of said central slab, extending each said longitudinal strap inwardly from one of said anchors embedded in said central slab to one of the interior I-beams;

providing longitudinally spaced support piers positioned on said central slab and on said exterior slabs, supporting the interior and exterior I-beams with said support piers; and providing longitudinally spaced exterior frame straps, extending each said frame strap from one said anchor embedded in one of said exterior slabs to the frame.

10. The method of claim 9, where some of said anchors embedded in said exterior slabs are connected to both an exterior lateral crossing strap and a frame strap.

11. The method of claim 9, further comprising providing clip members, connecting said clip members to said interior lateral crossing end straps, said exterior lateral crossing end straps and said interior lateral straps, and mounting said clip members on the interior and exterior I-beams to connect said interior lateral crossing end straps, said exterior lateral crossing end straps and said interior lateral straps to said interior and exterior I-beams.

12. The assembly of claim 11, further comprising providing mechanical fastening means and connecting said longitudinal straps to said interior I-beams with said mechanical fastening means.

\* \* \* \* \*